Oct. 19, 1965 H. KORNBICHLER 3,212,983
NEUTRONIC REACTOR
Filed Dec. 2, 1958 6 Sheets-Sheet 1
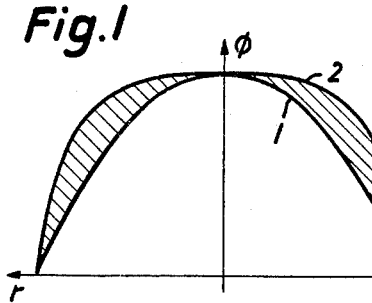
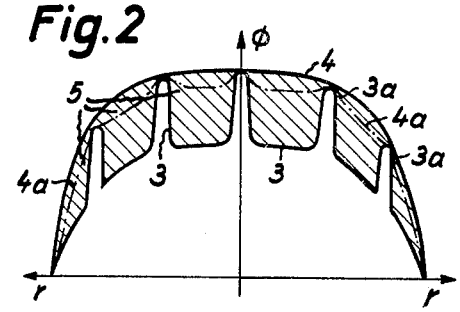
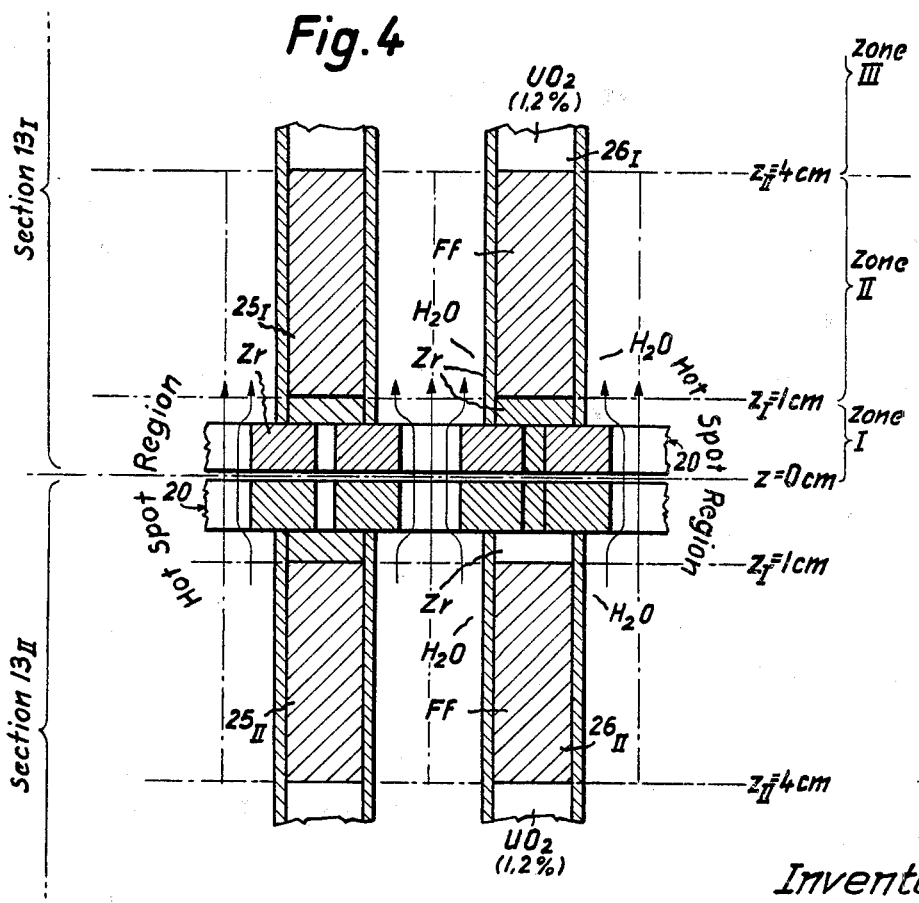
Inventor:
HEINZ KORNBICHLER
BY Toulmin & Toulmin
ATTORNEYS

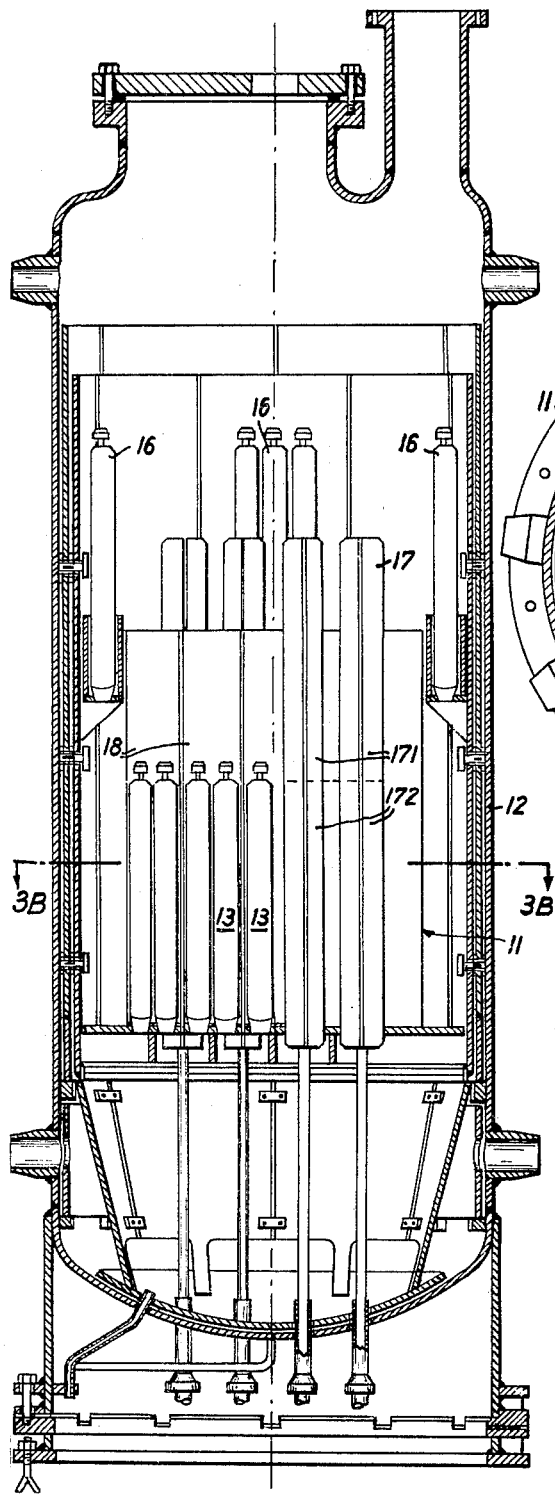
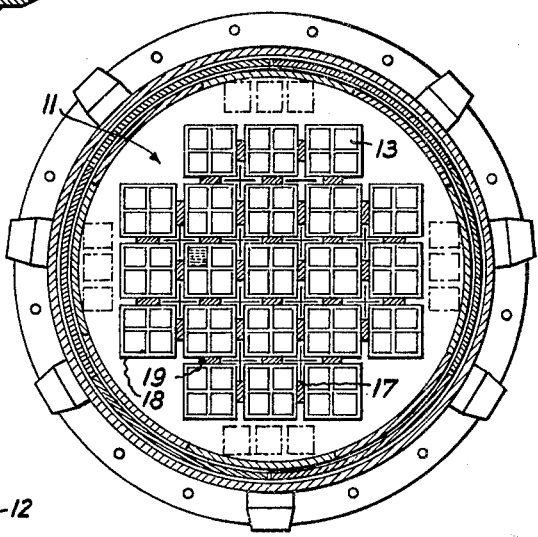
Fig. 3A
Fig. 3B
Inventor:
HEINZ KORNBICHLER
BY Toulmin & Toulmin
ATTORNEYS

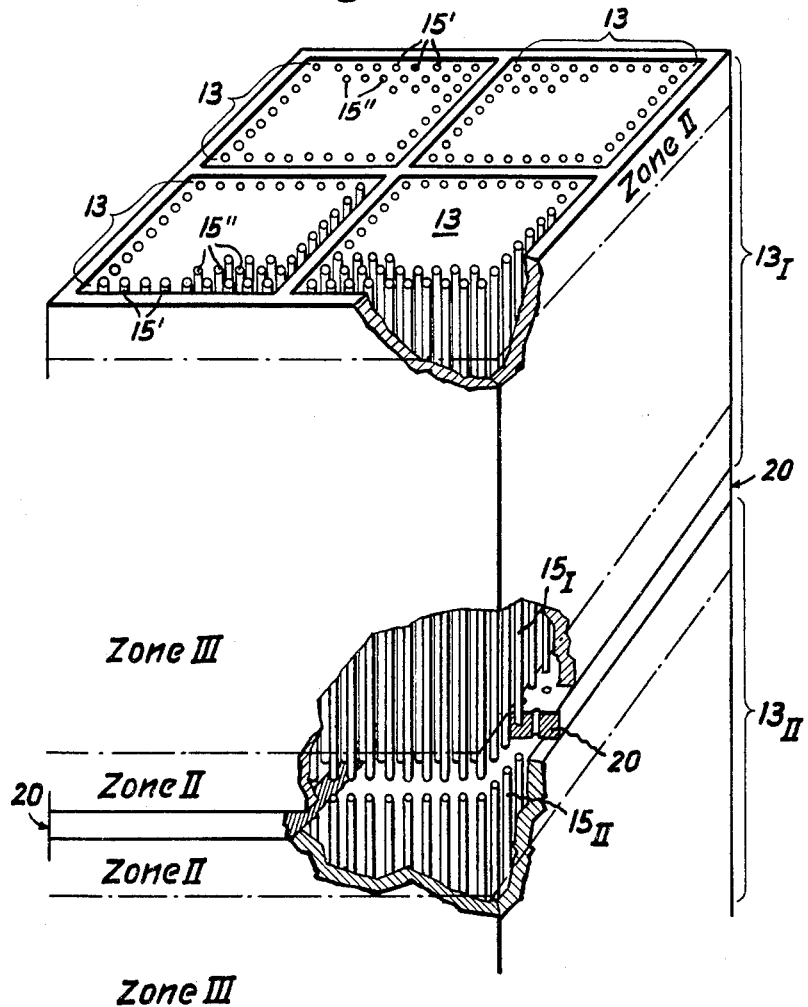

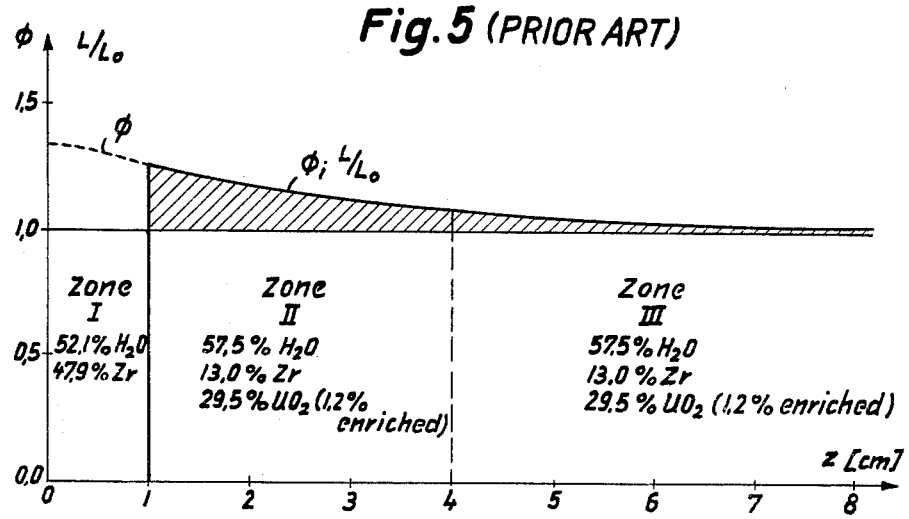
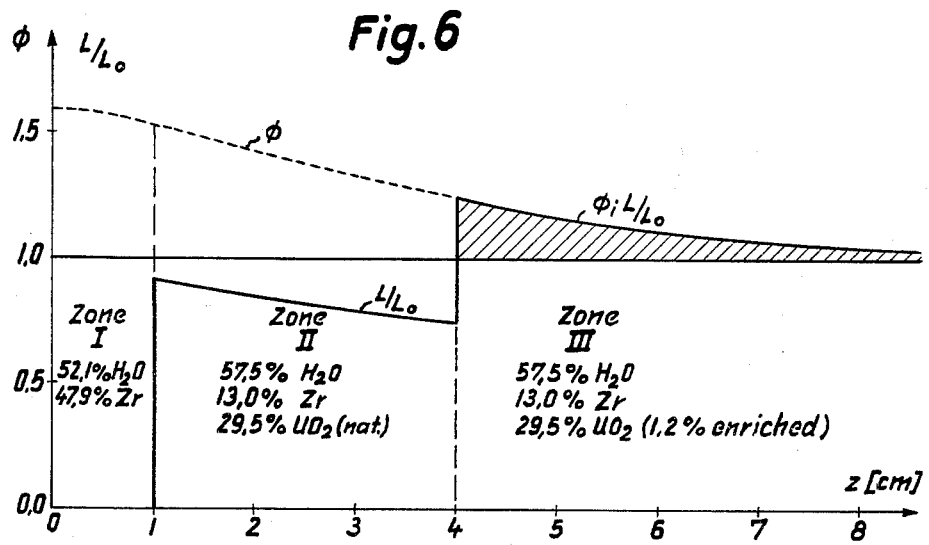

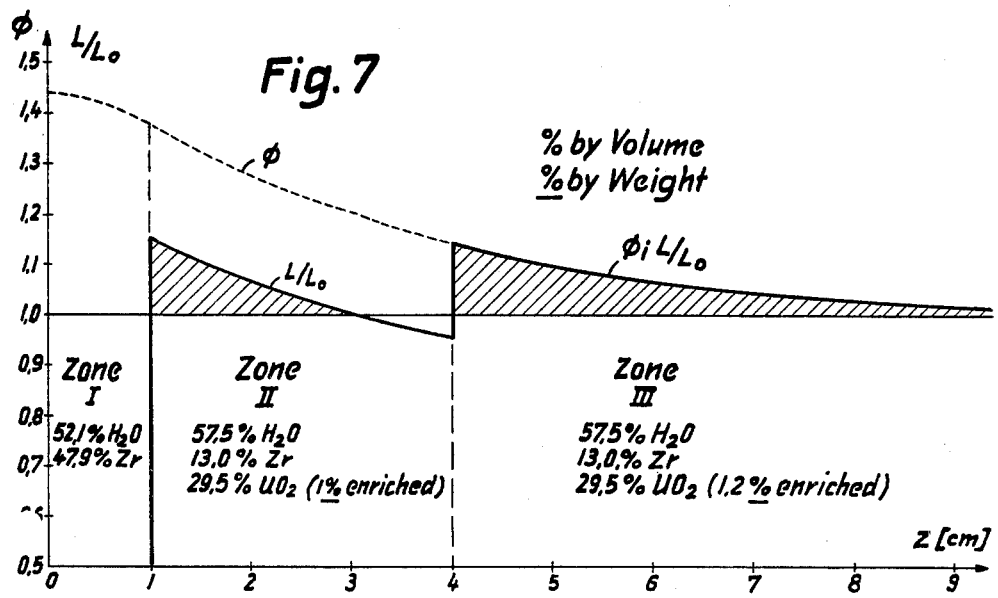
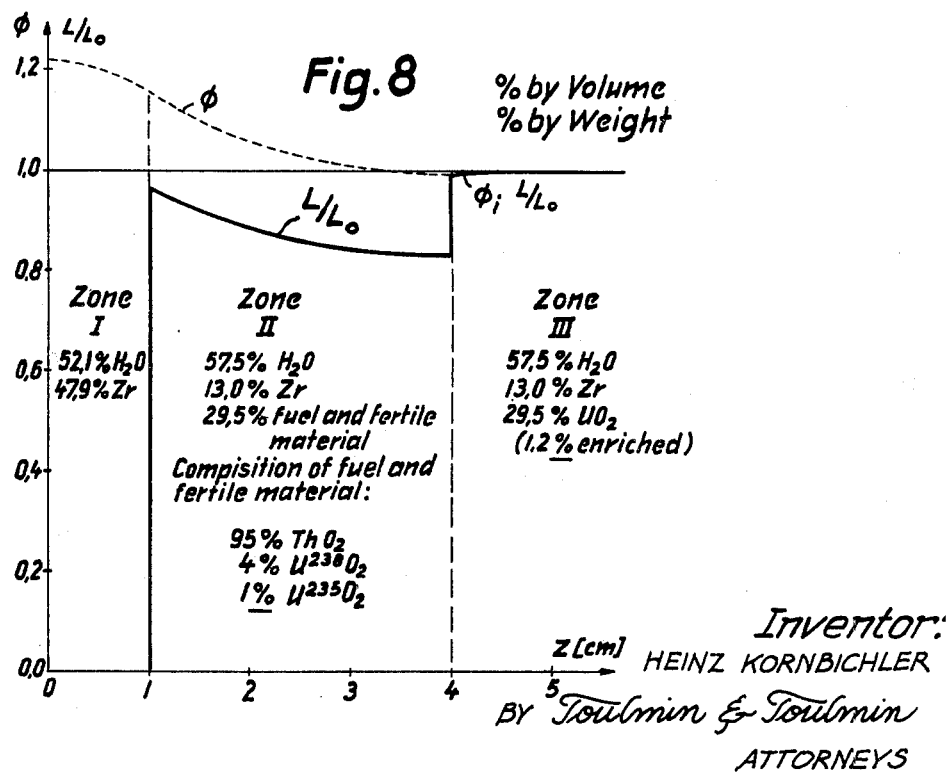

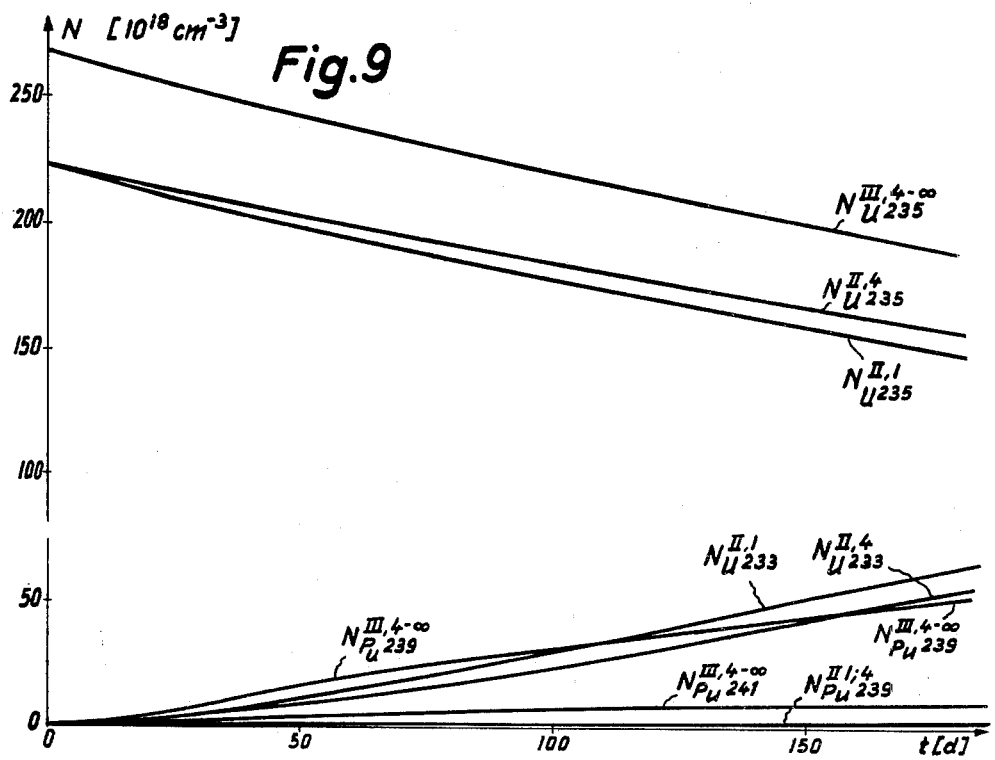
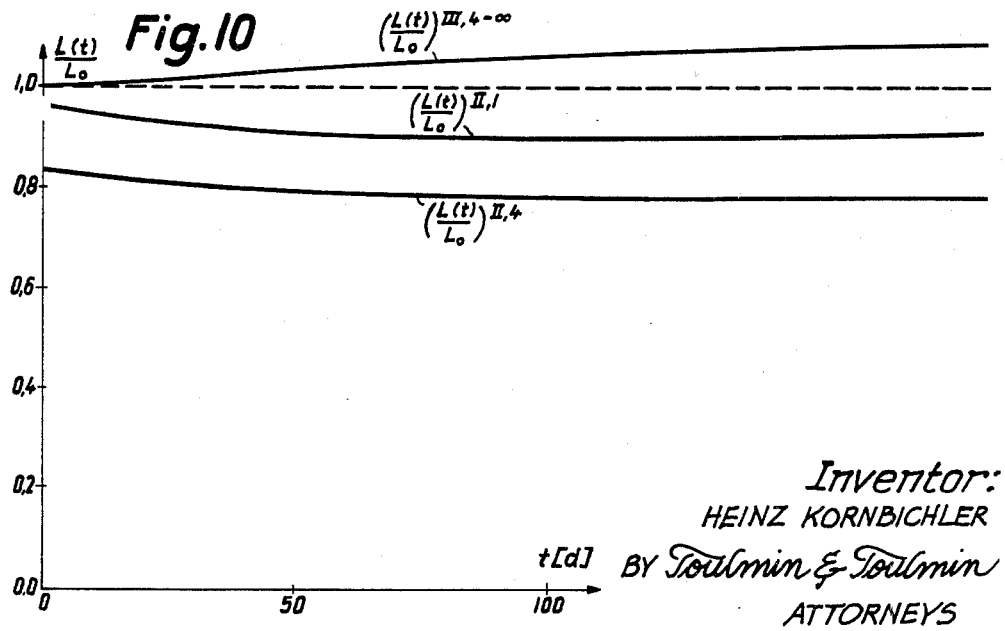

United States Patent Office 3,212,983
Patented Oct. 19, 1965

3,212,983
NEUTRONIC REACTOR
Heinz Kornbichler, Walldorf, Germany, assignor to Licentia Patent - Verwaltungs - G.m.b.H., Hamburg, Germany
Filed Dec. 2, 1958, Ser. No. 777,716
Claims priority, application Germany Dec. 5, 1957
3 Claims. (Cl. 176—42)

This invention relates to heterogeneous atomic power reactors.

It is an object of my invention to provide novel means in the core of a heterogenous power reactor, by which means it is possible to operate these reactors at a higher overall power output.

Terms used hereinafter in the specification and the appended claims of this application, such as "reactor," and "core," "fuel," "moderator" and the like are used in the sense conventional to the art of nuclear reactors.

It is another object of my invention to so construct a power reactor of the aforesaid type, that the peaks in the power output characteristic caused by hotspots in the core, are reduced or even completely eliminated, thereby permitting operation of the reactor at a higher overall output than is possible in the known reactors of this type.

Still further objects and advantages of the invention will become apparent by reference to the following explanation of the invention compared with the present state of the reactor art, in connection with the accompanying drawings which illustrate, by way of example, one form of reactor in which the invention may be used. However, this example is not to be taken as limitative of the scope of the invention, since the novel means according to the invention can be used in any type of nuclear reactor, in which fuel elements are disposed in a moderating medium. In the drawings:

FIGURE 1 is a graph of the apparent or "macroscopic" neutron flux distribution in a known nuclear reactor;

FIGURE 2 is a graph of the true or "microscopic" flux distribution in the same reactor;

FIGURE 3A is a vertical sectional view of a pressurized light water reactor;

FIGURE 3B is a horizontal sectional view, taken along 3B—3B in FIGURE 3A;

FIGURE 3C shows a detail of FIGURE 3A in a perspective partially sectional view;

FIGURE 4 is an enlarged fragmentary, vertical section taken through a fuel assembly 13 in FIGURE 3, illustrating schematically the region surrounding a joint or junction between the ends of two fuel elements aligned with each other in which zone hot spots may occur;

FIGURE 5 is a graph showing the neutron flux distribution in the conventional case when the part Ff in the zone II as well as zone III of a fuel rod such as shown in FIGURE 4 contains $UO_2$ with 1.2% enrichment in $U^{235}$;

FIGURE 6 is a graph similar to that shown in FIGURE 5, but in the case that Ff contains natural $UO_2$;

FIGURE 7 is a graph similar to that shown in FIGURE 5, but in the case that Ff contains $UO_2$ with 1.0% enrichment;

FIGURE 8 is a graph similar to that shown in FIGURE 5, but where Ff contains a mixture of 95% Th and 5% $UO_2$ with 20% enrichment;

FIGURE 9 is a graph showing the concentration N of fissionable material as a function of the time $t$ in days. This graph refers to fuel assemblies containing fuel rods as defined in FIGURE 8;

FIGURE 10 is a graph showing the power output per volume unit as a function of the time $t$ in days. This graph is based on the value of N given in FIGURE 9.

It is well known, that the power output of a reactor is proportional to the neutron flux multiplied by the concentration of fissionable nuclei. Curve 1 in FIGURE 1 shows the distribution of the neutron flux $\Phi$ in a reactor as a function of the distance $r$ from the center of the reactor core. Nuclear fission and heat generation are both greatest at the center of the reactor and least at its edges. Such a centrally peaked flux $\Phi$ limits the total power at which the reactor can operate, to a power, where the more central uranium bodies are operating at a maximum permissible temperature when adequate cooling is applied to the central portions of the reactor. It is known, in order to increase the power output of a reactor, to flatten the flux distribution across the reactor by various means, so that the rise of the total flux does not exceed the limit values of $\Phi$, which are characterized by the maximum permissible temperature of the central uranium bodies, whilst in the outer zones of the reactor the flux or power output is increased, as indicated in FIGURE 1 by curve 2. (See also U.S. Patent 2,774,730.)

In practice however, the curve 2 in FIGURE 1 has several peaks, as schematically indicated in curve 3 of FIGURE 2. These peaks indicate the existence of the well known hot spots, which constitute another limitation for the power output of a reactor. They mostly exist in zones, in which the ratio $$\frac{\text{moderator volume}}{\text{fuel volume}}$$

in comparison to the average ratio in the core of the reactor is increased, or where symmetry of the arrangement of the fuel elements is disturbed. As there exists a higher thermal neutron flux in these zones, there will occur relatively more fissions in those parts of the fuel elements, which are present in these zones.

The novel means according to my invention provides for the construction of a power reactor so that these peaks are either greatly reduced or will substantially disappear, so as to obtain the greatest possible neutron flux or the maximum power output of the reactor as practically illustrated by curve 4 in FIGURE 2. In this case the decrease of the areas 5 in FIGURE 2 is a measure for the increase of the power output achieved by the novel means according to the invention.

According to the present to the present invention, the hot spots in the reactor core are largely or practically entirely avoided by a proper combination of absorbers and of a decreased concentration of fissionable material in the said zones.

The avoidance or diminution of the hot spots by absorbers has the advantage of being free from losses in neutron economy. The use of these absorbers guarantees a good long-time behavior of the reactor as far as avoiding or diminishing of hot spots is concerned, i.e., the improvement achieved by the invention should last preferably for months, or as long as the fuel elements remain in the reactor. This is indicated in FIGURE 10.

In the drawings, the invention is illustrated by having reference to a pressurized light water reactor (PWR), comprising assemblies of fuel elements, such as plates or rods containing enriched uranium and with uniformly spaced rod geometry within each assembly and between assemblies, so as to give a normal, peaked neutron flux distribution. As stated above, the true flux distribution is schematically illustrated by curve 3 in FIGURE 3, while the apparent, conventionally given flux distribution can be characterized as shown in FIGURE 1.

In order to distinguish the true neutron flux distribution from the usual graphs of the type shown in FIGURE 1, curve 3 in FIGURE 2 is referred to as "microscopic" flux distribution, while the apparent flux distribution is also called "macroscopic" herein.

The liquid moderator used in the nuclear reactors to which the invention has been applied, can be light water, heavy water, or a conventional organic neutron velocity moderating liquid such as described, for instance, in "Nucleonics" vol. 14, No. 8 (1956).

Describing the invention more in detail, a PWR with 100 $MW_{el}$ is taken as an example in FIGURES 3A, 3B and 3C.

The core, generally designated by reference numeral 11 is disposed within a cylindrical pressure tank 12 of any suitable material such as stainless steel. The core 11 of this reactor consists of eighty-four fuel assemblies 13, which contain fuel rods 15 in a square structural pattern or lattice. Each of the fuel assemblies 13 is subdivided in longitudinal direction in five sections, of which only sections $13_I$ and $13_{II}$ are shown in FIGURE 3C.

Each section contains eighty-one fuel rods $15_I$, $15_{II}$ and so forth. The fuel rods 15 consist for example of $UO_2$, the $U^{235}$ content of which has been enriched to 1.2%. Reference numeral 16 indicates spare fuel assemblies in reserve positions. The pressure tank 12 is, of course, filled with light water as a moderator and coolant.

Furthermore, the reactor is equipped with twelve control elements 17. Boxes 18 of aluminum or the like non-fissionable material serve as guides for the control elements 17, which boxes contain always four fuel assemblies 13. Spacers between boxes 18 are indicated by reference numeral 19.

The boxes as well as the jackets 21 that may be provided about each fuel element 15, may be of non-fissionable material. Zirconium, steel, aluminum, magnesium and alloys of these materials have been used conventionally and are satisfactory when applied in the reactor according to the invention.

Joints 20, which separate the several sections of each fuel assembly, may consist of conventional structural material such as zirconium metal, and have passages or interstices which are filled with the liquid moderator. The total volume of a section or zone to be discussed hereinafter is, therefore, composed of the volume occupied by the structural material in the joint, the fuel in a fuel element, and the volume occupied by moderator.

As stated above, hot spots may exist in such zones, in which the volume ratio $$\frac{moderator}{fuel}$$

is greater than the average ratio of these substances in the reactor core. Such zones exist, for an example, where space has to be left for the control elements 17 between the boxes 18. According to the invention, hot spots in these zones can be diminished, by having the fuel rods 15' adjacent these zones contain a smaller concentration of fissionable material than the rest of the fuel rods 15" (FIGURE 3C), or by having these fuel rods 15' contain an absorber, preferably thorium 232. By a proper combination of these two features, hot spots in these zones can be practically avoided.

Thorium 232 may be introduced in the form of the metal, or $Th^{232}O_2$, or an alloy, practically only the $Th^{232}$ content of which determines the absorption effect.

Looking at any section of a fuel assembly, containing 81 fuel rods (for example in FIG. 3C) it will be understood that this assembly section of fuel rods taken as a whole has a boundary zone which includes the outer rods 15' and those portions of the fuel rod-ends which are located in zones II (upper and lower). It will be apparent from the following that hot spots will occur at such boundary zone, and the various features of the invention described below remedy this situation in effecting the fuel concentration in this boundary zone.

It will be described further below how to avoid hot spots during the operation of the reactor, if the control rods are moved out of the core, whereby the ratio $$\frac{moderator}{fuel}$$

is increased in the zones, from which the control rods are being removed.

The most significant hot spots, however, exist in a region around the joints 20 between the fuel rods, for instance $15_I$ and $15_{II}$, pertaining to adjacent sections, for instance the sections $13_I$ and $13_{II}$ shown in FIGURE 3C.

FIGURE 4 shows part of such a region surrounding the joint 20 between rods $25_I$ and $25_{II}$ aligned with each other, and neighboring rods $26_I$ and $26_{II}$, in a sectional view taken through part of a fuel assembly 13. To illustrate the significance of such hot spots, there are given hereinafter some results of calculations concerning hot spots in a 100 $MW_{el}$ PWR, which hot spots exist in the horizontally extending region about joint 20 separating the fuel rods of section $13_I$ from those of section $13_{II}$ in fuel assembly 13, as indicated in FIGURES 3C and 4.

For the calculation of neutron flux and power output in the region where the hot spots occur, according to the diffusion theory, the following assumptions were made:

(a) The core is homogenized in horizontal directions;
(b) The neutron flux is constant in horizontal directions;
(c) The fuel elments of about 50 cm. length are regarded as infinite in the vertical directions $\pm z$.

Three zones I, II, III beginning at the central horizontal plane of a joint 20 between two fuel rod sections are indicated by phantom lines in FIGURE 4. The volume proportions of the materials such as moderator ($H_2O$), non-fissionable structural material (Zr) and a mixture of fuel and fertile material (Ff) to the total volume of these zones throughout a section are expressed by the ratios:

$$\frac{V_{H_2O}}{V_{total}}$$

$$\frac{V_{Zr}}{V_{total}}$$

and $$\frac{V_{Ff}}{V_{total}}$$

or $$\frac{V_{UO_2}}{V_{total}}$$

these volume ratios are determined in the respective zones by the design of the core.

$Ff$ means that the part of the fuel rod located, for instance, in zone II, contains fuel and fertile material, whilst Zr, $UO_2$, and $H_2O$ are the usual chemical symbols. In FIGURE 3C, the total volume $V_{total}$ of zones II and III is indicated by phantom lines.

The design of the core also determines the distance $z_I$ of the border plane delimiting zone I, and in the example illustrated in FIGURE 4, $z_I=1$ cm., while the border plane delimiting zone II is chosen on the basis of the volume in which hot spots may occur, at a distance of $z_{II}=4$ cm. Another design of the core would of course determine the choice of border planes at other distances $z_I$, $z_{II}$ from the joint.

FIGURE 5 shows the flux distribution in the case that part $Ff$ of zone II contains $UO_2$ with 1.2% enrichment, which corresponds to what is conventional in the prior art, the entire fuel rod, in zone II as well as zone III of the rod containing the same material.

FIGURES 6 and 7 show examples of the neutron flux distribution, when, according to a main feature of the invention, the aforesaid part $Ff$ (zone II) contains $UO_2$ with a different enrichment than the rest (zone III) of the fuel rod.

FIG. 7 reveals that the enrichment in zone II is reduced by 1/6 of the enrichment in zone III while the reduction of course is even greater in case of FIG. 6.

FIGURE 8 shows the corresponding graph with a mixture of thorium and enriched $UO_2$ in the part of the fuel rod extending in zone II according to the invention. These graphs show that, if the fuel rods consist over their entire length of $UO_2$ with 1.2% enrichment in accordance with the prior art, then hot spots occur at their ends up to 30% higher than the average power (FIGURE 5). If the ends of the fuel rods consist over a length of about 3 cm. of $UO_2$ with the isotope ratio of $U^{238}$: $U^{235}$ occurring in nature, the hot spots are displaced in the direction of the middle of the fuel rods (FIGURE 6).

If in the area Ff (zone II) in FIGURE 4 uranium with 1% enrichment is used instead of natural uranium, then hot spots up to 15% above the average power have to be expected near planes at distances $z=1$ cm. and $z=4$ cm. from the joint (FIGURE 7).

The hot spots disappear, if the fuel and fertile material contained in the ends of the fuel elements (zone II) are made of a mixture of 95% $ThO_2$, 4% $U^{238}O_2$ and 1% $U^{235}O_2$, as shown in FIGURE 8.

It should be understood, that in case of a different design of the core or in case of a preferably higher enrichment of the fuel, the quantity of the absorbed and/or of the degree of enrichment of fuel below that of the rest (zone III) of the fuel rod may be different in comparison to this example. But in any case, it is always possible to find empirically the proper composition of absorber and enrichment of fuel, so as to diminish or avoid hot spots as shown graphically in FIGURES 6, 7 and 8.

Another object of the invention is to avoid hot spots in a reactor, which may occur, if the control elements change their position relatively to the reactor core. In this case, the ratio $$\frac{moderator}{fuel}$$

will also be increased, whenever the control rods, which consist of strong absorbers, are moved wholly or partly out of the core. An undersirable increase of the neutron flux resulting therefrom can be avoided, if a follower containing $Th^{232}$ is attached to the control rods. The dimensions of this follower and its content of $Th^{232}$ can be easily determined by the fact that the absorbing strength of this attached follower which is less strongly absorbing than the control element to which it is attached, must compensate the rise of the neutron flux, which would occur, if the control rod—without the attached follower according to this invention—is moved out of the core and so increases the ratio of $$\frac{moderator}{fuel}$$

Therefore, the upper parts 171 of control rods 17 in FIGURE 3 consist of a strong absorber like boronsilicate, while the lower parts 172 consist of a very weak absorber, containing thorium 232 in the said amount.

Conventionally, the above mentioned followers have generally been made of zirconium metal. This measure is not sufficient to entirely avoid the formation of hot spots when the control rods are withdrawn from the reactor core. Therefore, according to the invention, I use followers containing thorium 232 or another absorber, whereby all excess neutrons are captured and a flux peaking is avoided. In this case, I can also use boron, hafnium or any conventional absorber. When using these strong absorbers instead of thorium 232, they must be diluted with another material that their effectiveness is so reduced that only the above mentioned peaking is avoided.

A particular advantage of this invention is that the proposed means to avoid hot spots in a nuclear reactor, also guarantee a good long-time behavior of the reactor, as far as the change of the power output per volume unit as a function of time is concerned. FIGURES 9 and 10 refer to the PWR, as described in connection with FIGURE 3. Thus, FIGURE 9 is a graph showing the concentration N of fissionable material ($U^{235}$, $U^{233}$, $Pu^{239}$, $Pu^{242}$) as a function of time $t$ in days. In FIGURES 9 and 10 the indices in Roman numerals (II, III) indicate the zones, as defined in connection with FIGURE 4. The Arabic numerals (1), (4) and ($\infty$) indicate the distance $z$, also defined in connection with FIGURE 4. FIGURE 10 is a graph showing the power output per volume unit L as a function of time $t$ in days. The calculations are based on the values of fuel concentration etc. as stated in connection with FIGURE 9. It can be easily seen in FIGURE 10 that L increases with time from a starting value $L_0$ in fuel rod zone III, while L decreases with time in zone II. As the main part of power production takes place in zone III, the decrease of power production in zone II is of minor importance.

If it is desired to make $L(t)/L_0$ in section zone II close to the unit value, a compromise can be found between practically completely avoiding hot spots and attaining a still better long time-behavior, for instance by changing the concentration of fissionable material in the respective zones.

From the foregoing description, another advantage of the invention will be obvious. The hot spots are not only avoided, but, according to the invention, irrespective of the means used for this purpose, they are avoided preferably by a fertile material like $Th^{232}$, so that the absorbed neutrons are not wasted.

In providing for the presence of my absorber material in combination with a decrease of the enrichment of the fuel in those zones in which hot spots would occur otherwise, due to the geometrical configuration of the reactor core, I avoid the use of such absorber materials as boron, cadmium, hafnium and the like for this purpose, since the latter suffer from the drawback of being converted by the neutron bombardment in the nuclear process to lithium so that the strong absorber material gradually disappears and the absorption effect steadily decreases.

Therefore, in order to maintain the absorption effect in the zones in which hot spots are to be diminished or avoided according to the invention, I use as absorber material in these zones thorium 232. Only due to the continuous production of new fertile material from the thorium 232 absorber is it possible to maintain the power output in the above-mentioned zones at approximately the same level as in the main zones of the fuel assemblies.

While the reduction of the concentration of the fissionable material in $U^{238}O_2$ in the aforesaid zones leads to a diminution of the hot spots in these zones by about 15%, the further measure of replacing the major portion of $U^{238}O_2$ by $Th^{232}O_2$, or the corresponding replacement of $U^{238}$ by $Th^{232}$, permits to attain a further diminution of the hot spots, due to the higher absorption cross section of the thorium.

By the diminution of the hot spots, the peaks $3a$ of curve 3 in FIGURE 2 are reduced in height above the basic level of curve 3. Thereby it becomes possible to operate the reactor at a higher power curve raised to a level indicated, for instance, by the phantom line curve $4a$.

Since many changes could be made in the type of reactor described as an embodiment of this invention and since many apparent but widely different embodiments of this invention could be made without departing from the principles thereof, it is intended, that all matter contained in the above description of my invention, or shown in the accompanying drawings, shall be interpreted as illustrative and not in a limiting sense.

What I claim is:

1. In a liquid moderated nuclear reactor with water as a moderator and having a plurality of fuel assemblies, the combination comprising; a plurality of fuel elements in each of said assemblies, each fuel assembly consisting of a plurality of sections, and joints of non-fissionable structural material disposed between two adjacent sections the improvement in, each of said assembly sections being an end zone adjacent said joint, and being a main zone extending beyond said end zone, each of said joints including a supporting structure of a non-fissionable structural material having interspaces filled by said moderator, each of said end zones containing $H_2O$; Zr, and $UO_2$ of an isotope ratio occurring in nature, and each of said main zones containing $H_2O$, Zr and of $UO_2$ initially having a 1.2% enrichment, of fissionable material.

2. In a liquid moderated nuclear reactor with water as a moderator and having a plurality of fuel assemblies, the combination comprising; a plurality of fuel elements in each of said assemblies, each fuel assembly consisting of a plurality of sections, and joints of non-fissionable structural material disposed between two adjacent sections the improvement in, each of said assembly sections being an end zone disposed adjacent said joint, and a main zone extending beyond said end zone, each of said joints having interspaces filled by said moderator, each of said end zones initially containing 57.5% $H_2O$, 13.0% Zr, and 29.5% of $UO_2$ of at most 1% enrichment, and each of said main zones initially containing 57.5% $H_2O$, 13.0% Zr and 29.5% of $UO_2$ having a 1.2% enrichment, all percentages being of volume.

3. In a liquid moderated nuclear reactor with water as a moderator and having a plurality of fuel assemblies, the combination comprising; a plurality of fuel elements in each of said assemblies, each fuel assembly consisting of a plurality of sections, and joints of non-fissionable structural material disposed between two adjacent sections, the improvement in each of said assembly sections being an end zone disposed adjacent said joint, and a main zone extending beyond said end zone, each of said joints having interspaces filled by said moderator, each of said end zones initially containing 57.5% $H_2O$, 13.0% Zr, and 29.5% of a mixture of fuel and fertile material consisting, in percent by weight, of 95% $Th^{232}O_2$, 4% $U^{238}O_2$, and each of said main zones initially containing 57.5% $H_2O$, 13.0% Zr and 29.5% of $UO_2$ having a 1.2% enrichment, all percentages being by volume.

References Cited by the Examiner

UNITED STATES PATENTS 2,774,730  12/56  Young _____ 176—43
2,832,732   4/58  Wigner _____ 176—50

OTHER REFERENCES

Glasstone: "Principles of Nuclear Reactor Engineering," D. Van Nostrand Co., Inc., N.Y. (1955), pp. 744–745.

Atomic Energy Commission Document AECD–3715, "Improvements in MTR Fuel Assemblies and Operating Procedures," pp. 10–12, Feb. 1, 1954.

Atomic Energy of Canada, Ltd., Publication CRL–47, "Preparation and Sheathing Pu-Al Fuel Alloys for the WRX Reactor," Chalk River, Ontario, November 1957.

CARL D. QUARFORTH, *Primary Examiner*.

LEON D. ROSDOL, OSCAR R. VERTIZ, ROGER L. CAMPBELL, *Examiners*.